No. 642,299. Patented Jan. 30, 1900.
J. S. COPELAND.
VELOCIPEDE.
(Application filed May 26, 1898.)
(No Model.)
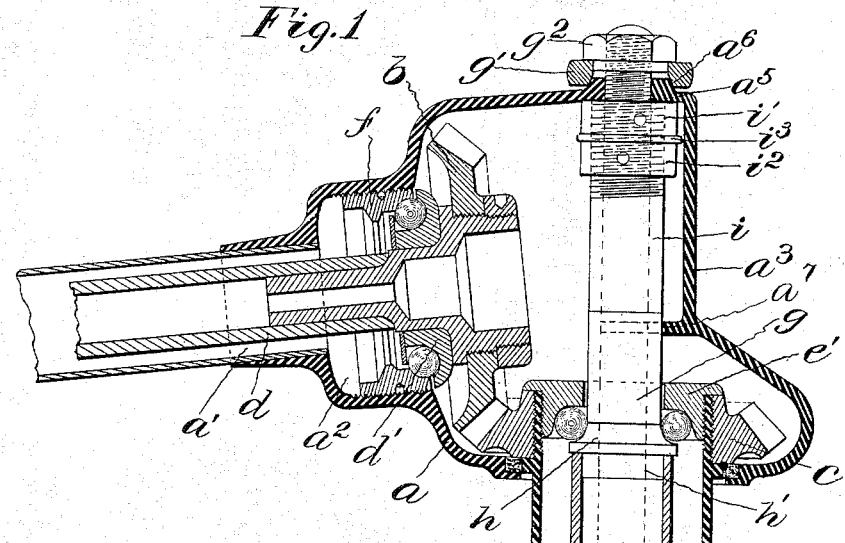
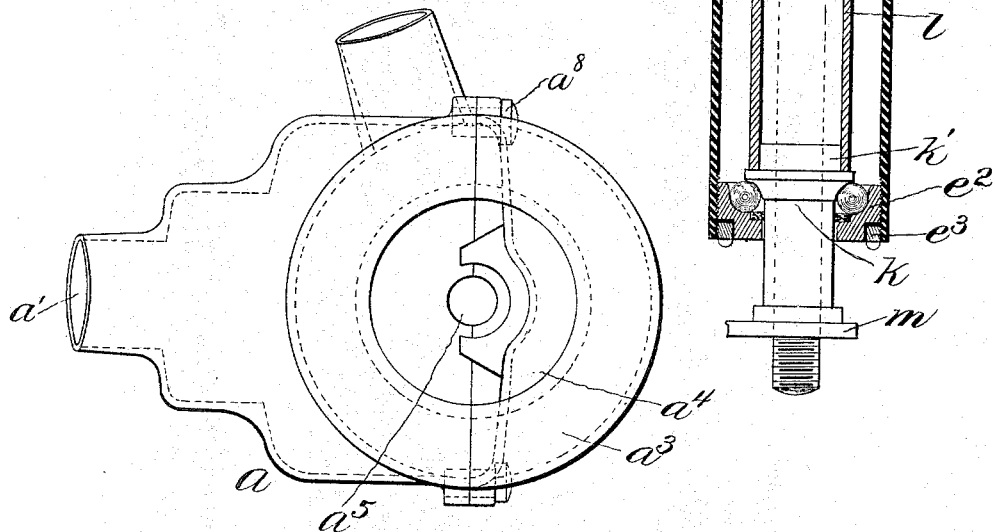
Witnesses:
William H. Barker.
Emma P. Coffin.
Inventor:
James S. Copeland
By Chas. L. Burdett,
Attorney.

UNITED STATES PATENT OFFICE.

JAMES S. COPELAND, OF HARTFORD, CONNECTICUT, ASSIGNOR, BY MESNE ASSIGNMENTS, TO THE AMERICAN BICYCLE COMPANY, OF JERSEY CITY, NEW JERSEY, AND NEW YORK, N. Y.

VELOCIPEDE.

SPECIFICATION forming part of Letters Patent No. 642,299, dated January 30, 1900.

Application filed May 26, 1898. Serial No. 681,753. (No model.)

*To all whom it may concern:*

Be it known that I, JAMES S. COPELAND, a citizen of the United States, and a resident of Hartford, in the county of Hartford and State of Connecticut, have invented certain new and useful Improvements in Velocipedes, of which the following is a full, clear, and exact description, whereby any one skilled in the art can make and use the same.

My invention relates more particularly to that class of velocipedes in which the power is transmitted by means of shafts and gears; and the object of my invention is to provide a vehicle of this class with means whereby the rear wheel and axle may be easily and readily removed in a manner to avoid disturbing the adjustment of the several parts.

To this end my invention consists in the combination of parts and in the details of construction of said parts and the combination of such details, as hereinafter described, and more particularly pointed out in the claims.

Referring to the drawings, Figure 1 is a top or plan view, in horizontal section, through that part of the driving mechanism of a velocipede located adjacent to the driving-wheel. Fig. 2 is a detail side view of the gear-case as seen from the top in Fig. 1 of the drawings.

In the accompanying drawings the letter $a$ denotes a rear bracket inclosing the bevel-gears $b$ and $c$ on the connecting-shaft $d$ and hub $e$ of the driving-wheel, respectively. The rear bracket $a$ has an opening $a'$ at its forward end, through which the connecting-shaft $d$ extends, and adjacent to this opening a recess $a^2$, in which is adjustably secured a ball-case $f$. A cone $d'$ is formed on the end of the connecting-shaft, balls being located between said ball-case and cone in the usual manner. The bevel-gear $b$ is removably secured to the end of the connecting-shaft. The bracket $a$ includes a cover $a^3$, secured to the rear part thereof, and an opening $a^4$ is formed in the bracket, into which projects the hub $e$ of the driving-wheel. An opening $a^5$ is formed in the opposite wall of this bracket in the form shown, complemental parts of the opening being located in the bracket and cover and in axial line with the opening $a^4$, and in this opening $a^5$ is located one end of the axle $g$. A ball-case $e'$ is secured to the interior threaded surface of the hub $e$, an annular flange on this ball-case overlying the hub of the bevel-gear $c$, secured to the outer threaded surface of the hub, the ball-case, with its flange, forming a species of lock-nut to hold the gear in position.

A cone $h$ is located on the axle $g$ in opposition to the ball-case $e'$, and an adjusting-sleeve $i$ is mounted on the axle between this cone and that wall of the bracket in which is located the opening $a^5$. An adjusting-nut $i'$ is located on the threaded outer surface of the adjusting-sleeve $i$ just inside of the bracket $a$ and a lock-nut $i^2$, with a washer $i^3$, next to the adjusting-nut. A boss $a^6$, having a beveled surface, is located on the outer wall of the bracket $a$, and a collar $g'$, having a beveled part fitting the beveled hub, is mounted on the axle $g$, a fastening-nut $g^2$ being employed to hold the parts together. The adjustment of the cone $h$ with respect to the ball-case is controlled by the adjusting-nut $i'$, that is located in a position of final adjustment by the lock-nut $i^2$, the cone and ball-case being held in relative position each to the other by means of the fastening-nut $g^2$.

A cone $k$ is located at the opposite end of the hub $e$ from the cone $h$, and a ball-case $e^2$ is secured to the threaded inner surface of the hub in opposition to the cone $k$, a lock-nut $e^3$ being employed to hold the case in proper adjustment with respect to the cone $k$. Each of the cones $h$ and $k$ has a reduced portion $h'$ and $k'$, forming a shoulder, a cone-sleeve $l$ fitting on the reduced portion of the cones and abutting against shoulders thereon. A toe-piece $m$ in engagement with the end of the axle thrusts against the cone $k$ or a washer inclosed between the two, a nut (not shown) located on the axle outside of the toe-piece holding said toe-piece and cone together.

The bracket $a$ has on its inner surface a projection $a^7$, forming a strut to directly support the thrust of the cone $g$, caused by the tendency of the gears $b$ and $c$ to separate from force applied to drive the vehicle.

It will be seen that from the construction of the bracket with a removable cap the rear wheel, with all the supporting parts, may be removed from the frame by simply removing the cap and loosening the nut at the opposite end of the axle, when the wheel may be readily removed. It is essential in vehicles of this class that the bracket shall be rigid to an extreme degree, and this is best attained by making it integral with the frame. By constructing such a bracket with the cap, as herein shown and described, the rear wheel may be readily removed without disturbing the adjustment of any of the parts.

It is to be noted that the cap $a^3$ is included as a part of the bracket, and where the term "bracket" is used in the claims it is to be understood as covering the bracket, including the cap when such cap is not made a separate element of the claims. An important feature of the invention resides in so constructing the cap that when it is secured in position this operation at the same time clamps in position the axle projecting through the case and carrying the driving-wheel, the parts being so secured in proper adjustment with relation to each other.

There have been shown and described herein screws $a^8$ for fastening that end of the cover adjacent to the hub in place; but it is obvious that other means may be employed for securing the cover in place at this end of the hub and yet come within the scope of the invention.

An important feature of invention of the fastening means, including the boss $a^6$ and collar $g'$, resides in the fact that the axle is accurately centered when the cover $a^3$ is secured in place whether the hole through the side wall of the bracket be of the same size as the axle or larger, so long as the collar closely fits the axle. This collar and the boss are not, however, indispensable to the embodiment of my invention, as the removable cap may be held on entirely with the screws or other fastening means which may be employed.

I claim as my invention—

1. A bracket, rotating parts projecting into the bracket, gears located on the rotating parts and in mesh with each other, and a strut located on the inner wall of the bracket, partially encircling the support for one of the rotating parts and opposing the thrust of the gears on one of said parts.

2. In combination in a vehicle, a bracket composed of sections divided on a plane central of the axle of the driving-wheel, a beveled boss with complementary parts on each bracket-section adjacent to the axle-socket in the bracket, an axle extending through the bracket centrally of the boss, rotating parts including a cone-and-ball case supported by the axle, an adjusting-nut mounted on the axle inside of the case adjacent to the boss, a ring having a beveled surface coöperating with the beveled surface on the boss, and means for clamping the ring on the boss.

3. In combination with the frame of a vehicle, a bracket integral therewith, a shaft projecting into the bracket, a support, a wheel-hub projecting into the bracket and operatively connected with said shaft and mounted on the support, a cap secured to the bracket on a plane passing through the axis of the support, and a strut formed on the inner surface of the cap and partially supporting said wheel-hub.

4. In combination with the frame of a vehicle, a bracket integral therewith, a cap secured to the bracket, complemental parts of a boss located on the bracket and cap, a collar fitting the boss and holding the bracket and cap in engagement, and means for securing the collar in position.

5. In combination with the frame of a vehicle, a bracket integral therewith, a cap secured to the bracket, complemental parts of a boss located on the bracket and cap, a collar fitting the boss and holding the bracket and cap in engagement, an axle held by said collar, and a strut on the inner surface of the cap forming a partial support for said axle.

6. In combination with the frame of a vehicle, a bracket integral therewith, a shaft projecting into the bracket, an axle projecting into the bracket, a wheel-hub mounted on the axle and operatively connected with the shaft, a cap removably secured to the bracket on a plane coincident with the axis of the wheel-hub, complemental parts of a boss located on the bracket and cap, a collar surrounding said boss, and means for holding the collar in place.

7. In combination with the frame of a vehicle, a bracket integral therewith, an axle projecting through the bracket, a wheel-hub mounted on the axle and means for driving the wheel-hub, a cap secured to the bracket on a plane coincident with the axis of the wheel-hub, complemental parts of a beveled boss located on the bracket and cap, a collar having a beveled surface fitting the beveled surface on the boss, and means for holding the collar in place.

JAMES S. COPELAND.

Witnesses:
M. DIETERICH,
HERMANN F. CUNTZ.